(12) United States Patent
Dolezel

(10) Patent No.: US 11,020,829 B2
(45) Date of Patent: Jun. 1, 2021

(54) PALLET JACK AXLE (PIN) PRESS

(71) Applicant: Michael Donald Dolezel, Lexington, SC (US)

(72) Inventor: Michael Donald Dolezel, Lexington, SC (US)

(*) Notice: Subject to any disclaimer, the term of this patent is extended or adjusted under 35 U.S.C. 154(b) by 191 days.

(21) Appl. No.: 16/406,653

(22) Filed: May 8, 2019

(65) Prior Publication Data
US 2020/0353578 A1 Nov. 12, 2020

(51) Int. Cl.
*B23P 19/04* (2006.01)
*B66F 5/04* (2006.01)

(52) U.S. Cl.
CPC ............ *B23P 19/04* (2013.01); *B66F 5/04* (2013.01); *B60B 2320/10* (2013.01)

(58) Field of Classification Search
CPC ......... B23P 19/04; B23P 19/041; B23P 19/06; B60B 2320/10; B60B 2340/52; F01D 5/3007; B66F 5/04; B66F 2700/055
See application file for complete search history.

(56) References Cited

U.S. PATENT DOCUMENTS 10,821,308 B1 * 11/2020 Krumrei ............... A62B 3/005

* cited by examiner

*Primary Examiner* — Christopher J Besler
(74) *Attorney, Agent, or Firm* — Melissa B. Neely

(57) ABSTRACT

The present invention relates to a device for the removal of a pallet jack's load wheel pins. Where said invention is comprised of a hydraulic jack secured in a horizontal position within a frame assembly. A tooling adapter is fitted on the end of the piston rod so that the piston rod may push against the pallet jack's load wheel pin when the piston rod is extended. The frame assembly is slid underneath the forks of the pallet jack and the hydraulic jack's piston rod is aligned with the pallet jack load wheel pins that are to be removed. When the hydraulic jack is activated, the piston rod pushes against the pallet jack's load wheel pins pushing them out from the load wheel allowing the load wheel to be removed from the pallet jack's fork. Large extension springs are mounted on the underside of the frame assembly and are attached to piston rod to return the piston rod to the hydraulic jack once the load wheel pins are removed.

3 Claims, 6 Drawing Sheets

PALLET JACK AXLE (PIN) PRESS

STATEMENT REGARDING FEDERALLY SPONSORED RESEARCH OR DEVELOPMENT

This invention was not made by an agency of the United States Government nor under a contract with an agency of the United States Government.

CROSS REFERENCE TO RELATED APPLICATIONS

Not Applicable

THE NAME OF THE PARTIES TO JOINT RESEARCH AGREEMENT

Not Applicable.

INCORPORATION BY REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable

BACKGROUND OF THE INVENTION

Field of the Invention

A pallet, sometimes referred to as a skid, is a transport structure that supports goods in a stable fashion while being moved or stored. An example of a pallet is shown in FIG. 1. It is the structural foundation of a unit load which allows handling and storage efficiencies. Pallets are typically moved by being lifted and then transported on a mechanical device such as a fork truck, pallet jack, or crane.

Pallet jacks are the most basic form of a forklift and are generally used to lift and move pallets of materials within a warehouse. An example of a pallet jack is shown in FIG. 2. The load wheels (D) at the front end of a pallet jack's forks (F) are subject to significant stress and wear in utilizing the pallet jack to lift and move loaded pallets, thus necessitating replacement of the load wheels. Additionally, the load wheels (D) often become restricted in their movement due to rusted load wheel pins (axels) which necessitate removal of the load wheel pins.

The current method for removal of the load wheels is the utilization of a hammer and punch to physically force out the load wheel pins by hitting the punch which is placed on the end of the load wheel pin. This operation is time consuming and labor intensive. The invention disclosed in this application is a device for the removal of the load wheel pins without the intensive manual physical effort required by the hammer and punch method.

Description of Related Art

Not Applicable

BRIEF SUMMARY OF THE INVENTION

The present invention relates to a device for the removal of a pallet jack's load wheel pins. Where said invention is comprised of a hydraulic jack secured in a horizontal position within a frame assembly. A tooling adapter is fitted on the end of the piston rod so that the piston rod may push against the pallet jack's load wheel pin when the piston rod is extended. The frame assembly is slid underneath the forks of the pallet jack and the hydraulic jack's piston rod is aligned with the pallet jack load wheel pins that are to be removed.

When the hydraulic jack is activated, the piston rod pushes against the pallet jack's load wheel pins pushing them out from the load wheel allowing the load wheel to be removed from the pallet jack's fork. Large extension springs are mounted on the underside of the frame assembly and are attached to piston rod to return the piston rod to the hydraulic jack once the load wheel pins are removed.

DETAILED DESCRIPTION OF THE INVENTION

Figure 1:
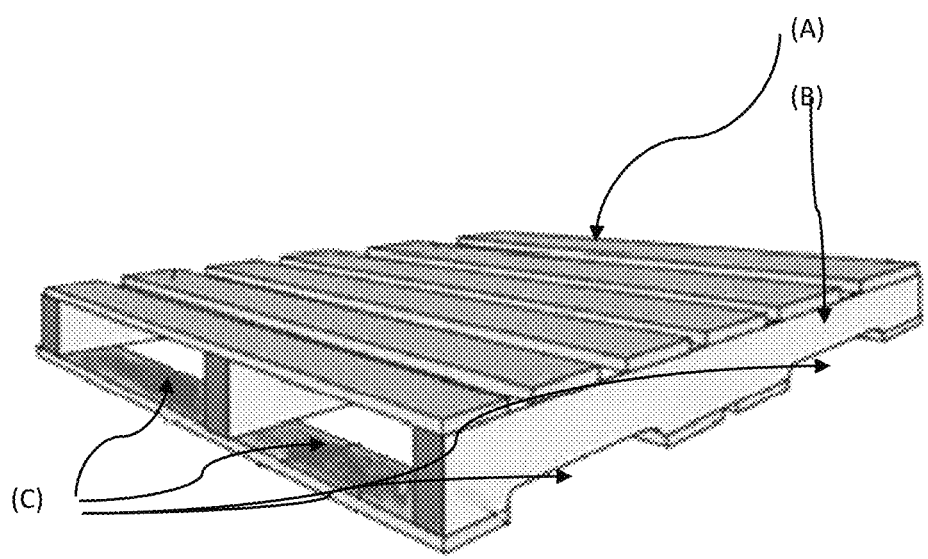
FIG. 1 is an example of a basic pallet used to storage and movement of materials. The pallet consists of a top deck (A) with side panels (B) and open spaces (C) for the insertion of the forks of a pallet jack or fork truck. The pallet is not claimed as part of the invention.

The present invention relates to a device for the removal of a pallet jack's load wheel pins. Where said invention is comprised of a hydraulic jack (10) secured in a horizontal position within a frame assembly (20). A tooling adapter (30) is fitted on the end of the hydraulic jack's piston rod to affix a metal dowel pin (32) which is pushed against the pallet jack's load wheel pin when the hydraulic jack (10) is activated and the piston rod extended.

The frame assembly (20) is slid underneath the forks of the pallet jack and the metal dowel pin (32) is aligned with the pallet jack load wheel pins that are to be removed. As the hydraulic jack (10) is activated, the piston rod extends pushing the affixed tooling adapter (30) and the metal dowel pin (32) against the pallet jack load wheel pin. The load wheel pin is thus pushed out from the center of the load wheel so that wheel may be removed and new wheels and/or pins may be installed.

The frame assembly (20) is rectangular in shape with a rectangular base or bottom panel (26) which has an underside and a topside and two long sides and two short sides, two side panels (24) affixed to the long sides of the base (26) and rise above the base's (26) topside, and two end panels (25, 27) affixed to the short sides of said base (26) and rise above the base's (26) topside. The end panels (25, 27) are taller than the two side panels (24). Each end panel (25, 27) has a horizontal aperture (22) in the top section of the end panel (25) that serve as handles for carrying and positioning of the invention. The hydraulic jack (10) is mounted at one end of the frame assembly (20). The end panel (25) at the end of the frame assembly opposite the end with the hydraulic jack (10) has a second aperture (23) to allow the removal of the pallet jack's load wheel pin. The bottom panel has an elongated aperture (21) positioned and sized to correspond with the position of the tooling adapter (30) from its at rest position to its fully extended position.

For the preferred embodiment of the invention, the frame assembly has a length of 24 inches, width of 8 inches and a depth of 8 inches. The frame assembly is not limited to these dimensions and may vary in length, width and depth.

The preferred embodiment of the invention utilizes a commercially available 12 ton hydraulic jack (10). The hydraulic jack (10) is secured to the frame assembly by means of two of more mounting clamps (11) which are bolted (12) to the underside of the frame assembly (20).

A tooling adapter (30) is affixed to the piston rod of the hydraulic jack (10). The tooling adapter (30) is used to effectively extend the length and reduce the diameter of the end of the piston rod that is pushed against the pallet jack's load wheel pin by affixing a reduced diameter metal dowel pin (32) to the hydraulic jack. The tooling adapter (30) is further affixed to roller bearings (31) and a spring retainer (41) on the underside of the frame assembly (20). The spring retainer (41) is attached to one end of each of the extension springs (40) located on the underside of the frame assembly (20).

Two or more extension springs (40) are affixed to the underside of the frame assembly (20) positioned below where the hydraulic jack is mounted. One end of the springs (40) is attached to the spring retainer (41). The opposite end of the springs (40) is attached to the spring mounting bolt (42). The spring mounting bolt (42) is secured to the end panel (27) of the frame assembly (20). In the preferred embodiment of the invention the springs are rated for 20 pounds per inch with a maximum load of 110 pounds and maximum travel of 4.4 inches. However, the springs utilized in the invention are not limited to the aforementioned rating.

As the hydraulic jack (10) is used to push out the pallet jack's load wheel pins, the springs (40) are extended as the piston rod moves the tooling adapter (30). When the pressure is released from the jack (10), the springs (40) contract and move the tooling adapter (30) back to its starting position.

The preferred embodiment of the invention utilizes a commercially available 12 ton hydraulic jack, but the invention is not limited to a particular size of hydraulic jack as other embodiments of the invention are contemplated using smaller or larger (lower or higher powered) hydraulic jacks. The frame assembly (20) in the preferred embodiment of the invention is constructed of steel and painted to inhibit corrosion.

Potential CPC patent classification for this invention: B25B—Tools or Bench Devices Not Otherwise Provided For, For Fastening, Connecting, Disengaging or Holding.

Figure 2:
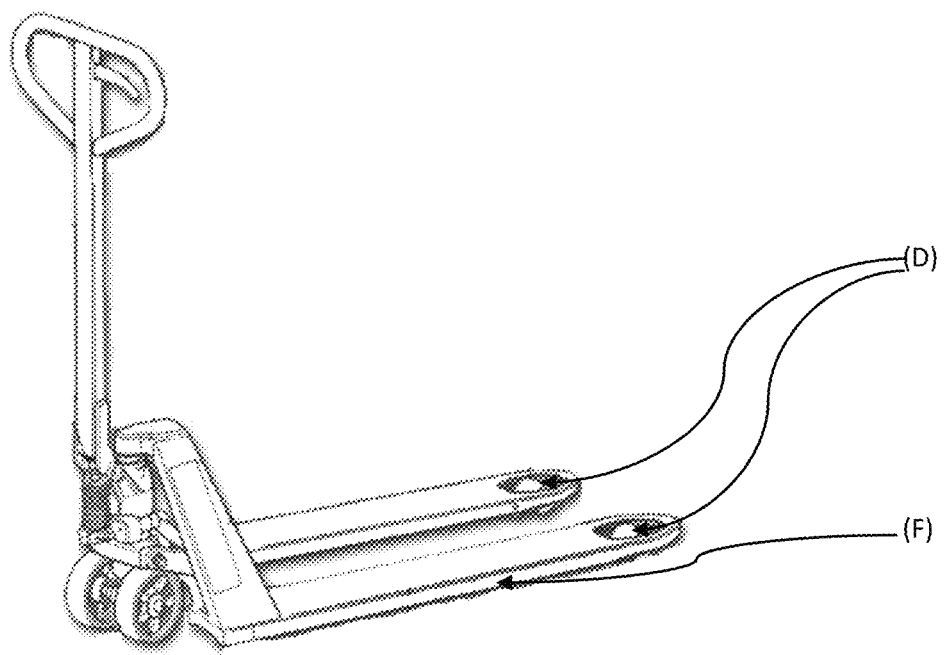
FIG. 2 is an example of a basic pallet jack used for the movement of materials affixed to a pallet. The present invention is directed to maintenance activities involving the load wheels (D) at the end of the forks (F). The pallet jack is not claimed as part of the invention.
Figure 3:
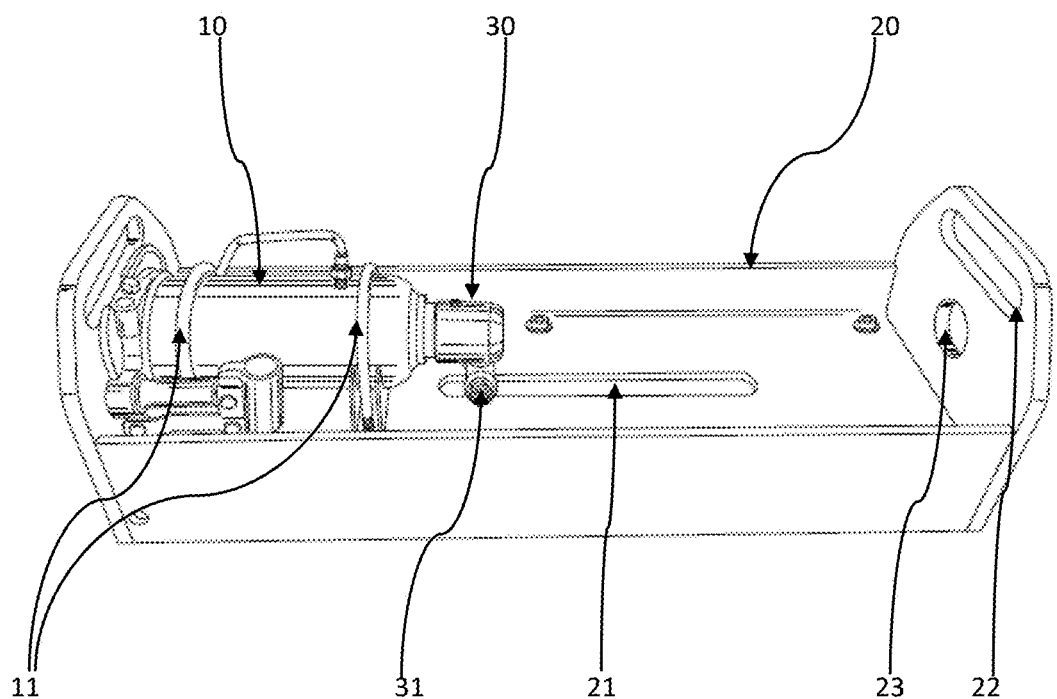
FIG. 3 is a top view of the invention showing the hydraulic jack (10) affixed to the frame assembly (20) by means of mounting clamps (11). A tooling adapter (30) is affixed to one end of the hydraulic jack for fitting a metal dowel pin which will press against the pallet jack load wheel pin when activated; roller bearings (31) are affixed to the tooling adapter (30) which is further affixed to extension springs on the underside of the frame assembly (20). A channel (21) is cut into the center portion of the frame assembly (20) for the movement of the piston rod and tooling assembly (30) when the hydraulic jack (10) is operated. Handles (22) are provided in either end of the assembly frame (20) and an aperture (23) is provided for the removal of pallet jack load wheel pin.
Figure 4:
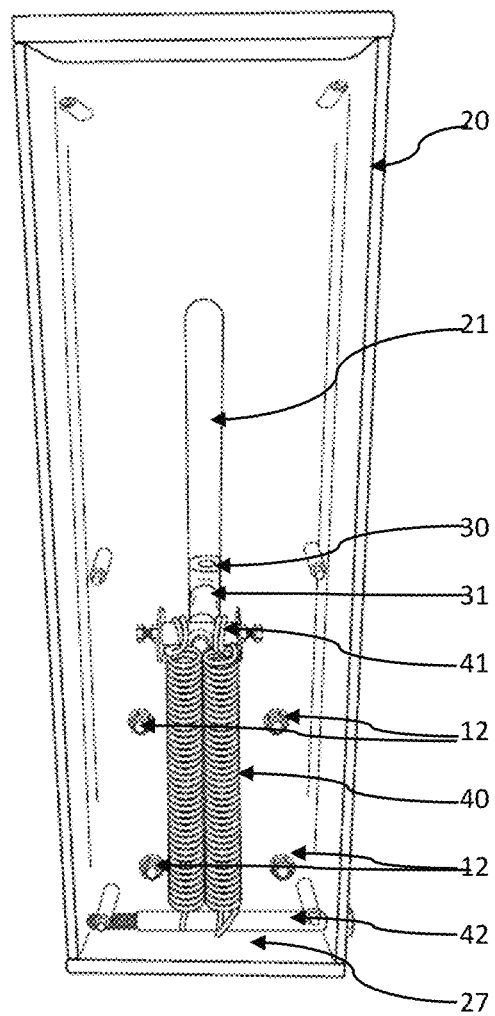
FIG. 4 is view of the bottom side of the frame assembly (20) showing the extension springs (40) along with the spring retainer (41) and the spring mounting bolt (42). The bolts (12) for the hydraulic jack mounting clamps (11) are also shown.
Figure 5:
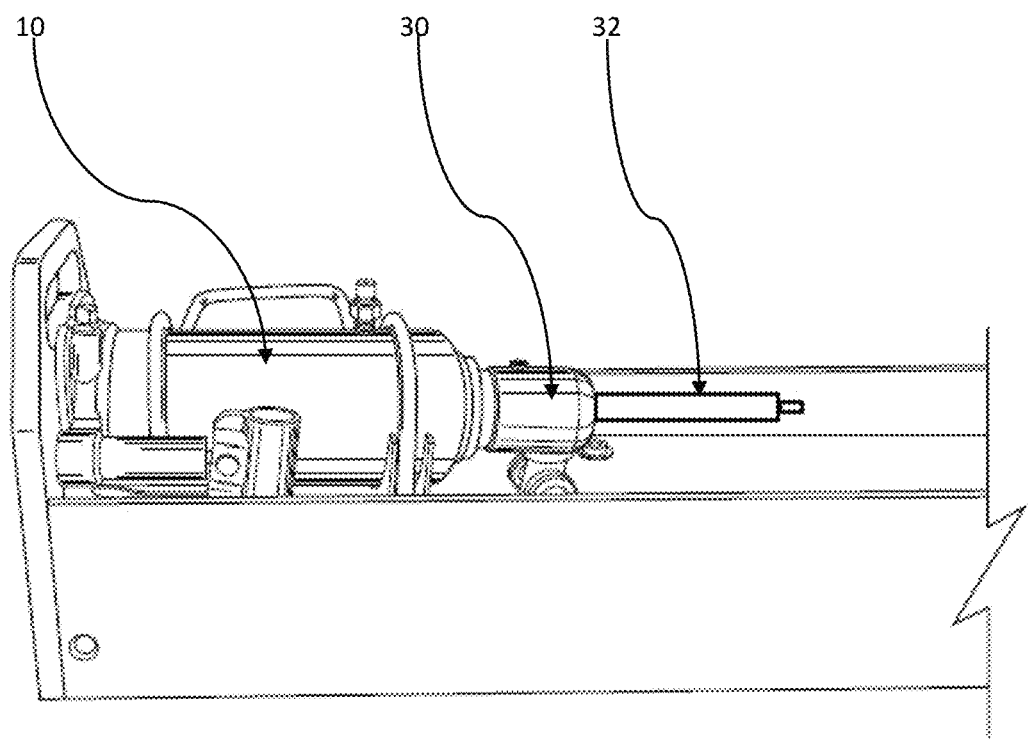
FIG. 5 is view of the hydraulic jack (10) showing the tooling adapter (30) and the metal dowel pin (32)
Figure 6:
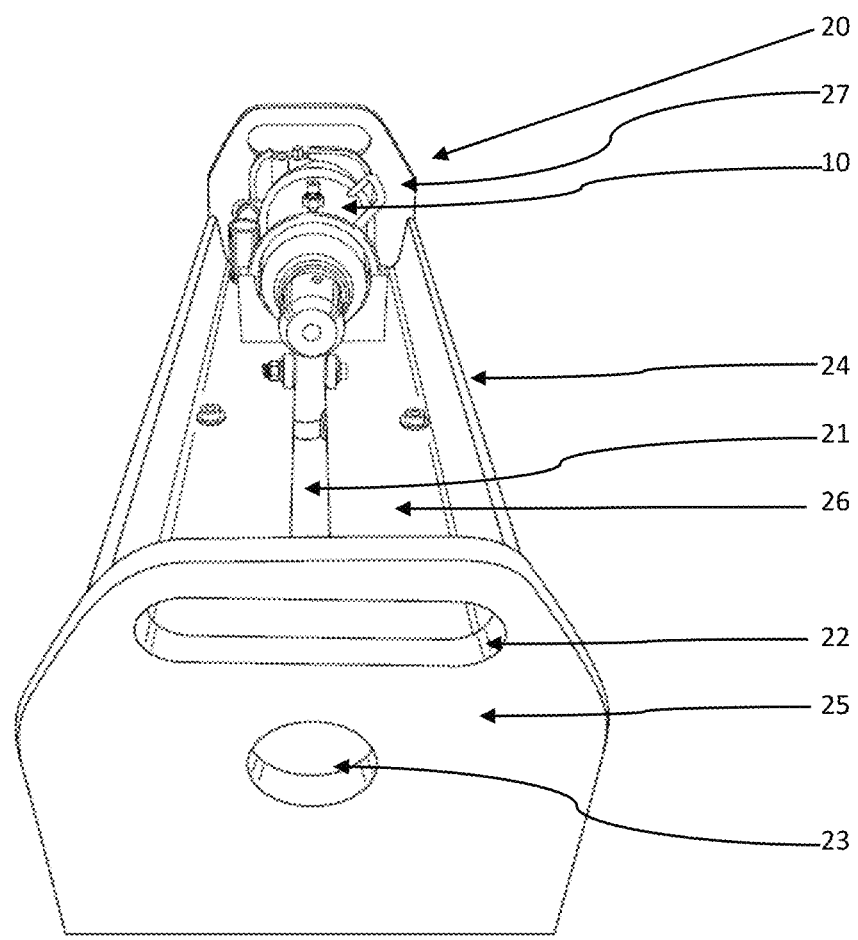
FIG. 6 is a front view of the invention. Shown in this figure is the hydraulic jack (10) and the frame assembly (20). Features of the frame assembly (20) include the end panels (25, 27), the base (26), the side panels (24), the channel (21) in the base (26), the handle apertures (22) in the end panels (25, 27) and the aperture (23) in end panel (25) which allows the removal of the pallet jack's load wheel pin.

The present invention described above and illustrated in FIGS. 1 through 6 is visualized as the preferred embodiment of the invention. It is envisioned that this invention may be embodied in many different forms and should not be construed as limited to the embodiments set forth herein. It will be understood by those skilled in the art that changes in forms and details may be made without departing from the spirit and scope of the present application. It is therefore intended that the present invention not be limited to the exact forms and details described and illustrated herein but falls within the scope of the appended claims.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a stricture or feature that is disposed "adjacent" another feature may have portions that overlap or underlie the adjacent feature.

SEQUENCE LISTING

Not Applicable

The invention claimed is:

1. A device for the removal of pallet jack axel pins, where said device comprises a rectangular shaped frame assembly, where said frame assembly comprises a rectangular base with an underside, topside, two long sides and two short sides, two side panels affixed to the long sides of said base and rise above said base's topside and two end panels affixed to the short sides of said base and rise above said base's topside; a hydraulic jack affixed to the topside of said base of said frame assembly at one end, where said hydraulic jack is further equipped with a tooling adapter that affixes a metal dowel pin to a piston rod of the hydraulic jack and where said tooling adapter is attached to roller bearings and a spring retainer; and two springs positioned on the underside of the base of said frame assembly underneath a position of said hydraulic jack, where one end of said springs are connected to said spring retainer and an opposite end of said springs are connected to a spring mounting bolt which is affixed to the underside of said frame assembly's base.

2. The device according to claim 1, where said frame assembly base has an elongated aperture.

3. The device according to claim 1, where one of said end panels is positioned at an end of the frame assembly opposite of where said hydraulic jack is positioned has an aperture for removal of the pallet jack axel pin.

* * * * *